Nov. 15, 1938.   H. D. EKLUND   2,136,361

METHOD OF FORMING SERVICE PORTIONS OF FOODSTUFF

Filed Feb. 26, 1937

INVENTOR.
Helen D. Eklund.
BY
Geo Stevens
ATTORNEY.

Patented Nov. 15, 1938

2,136,361

UNITED STATES PATENT OFFICE 2,136,361

METHOD OF FORMING SERVICE PORTIONS OF FOODSTUFFS

Helen D. Eklund, Duluth, Minn.

Application February 26, 1937, Serial No. 127,960

2 Claims. (Cl. 107—54)

This invention relates to a novel method of forming a cake and has special reference to the baking of sponge, angel food cakes or the like.

The principal object of the invention is to provide a cake which may be subsequently cut in the most convenient and economical shape for the making of what are known as ice cream sandwiches or the like, and desserts of a similar form. Having this object in mind it is also deemed essential that in forming such a cake cognizance be given to the standard size of ice cream bricks being marketed at the time so that economy and convenience in this respect may also be accomplished.

Other objects and advantages of the invention will appear in the following description thereof.

Referring now to the accompanying drawing, forming part of this application, and wherein like reference characters indicate like parts:

The pan or receptacle, the side walls of which are illustrated at 1 and the marginal bottom at 2, is square in plan view as well as the column 3, and this shape is essential in carrying out the invention.

The marginal bottom 2 extends wholly around the receptacle and projects inwardly from the side walls thereof any desired distance but preferably, as illustrated, only a portion of the distance between the side wall and the column. The column is provided with a flange-like bottom 4 of slightly smaller dimension than the interior of the receptacle for convenience in removing and applying same, and while I have not illustrated the side walls of the receptacle and of the column as being slightly tapered (the column walls inwardly and the pan walls outwardly) for convenience in removal of the cake, the same may be so formed if desired, though I prefer to make them all as nearly at right angles to the bottom as possible, as the latter is obviously better adapted for carrying out the objects of the invention.

Figure 1:
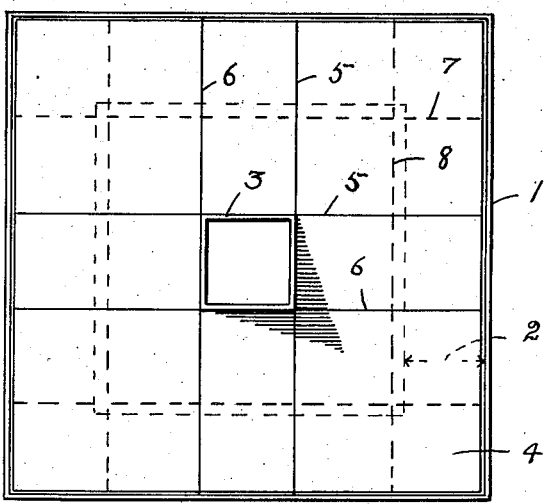
Figure 1 is a top plan view of one of the improved pans.
Figure 2:
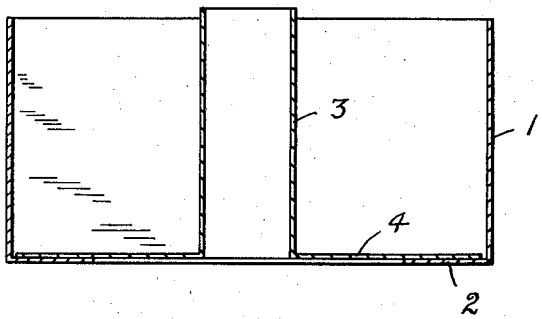
Figure 2 is a central vertical section through Figure 1.
Figure 3:
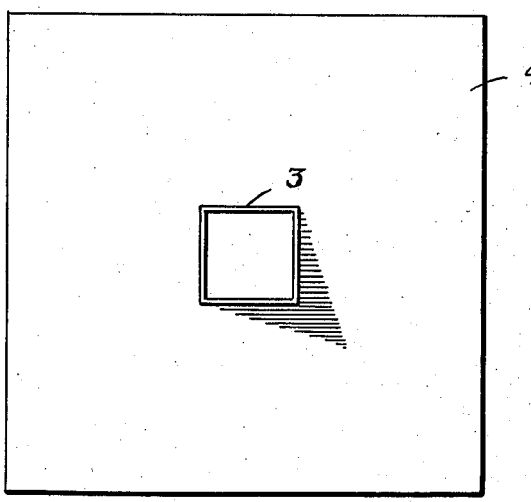
Figure 3 is a top plan view of the center column and its attached bottom portion.

As indicated in both full and dotted lines within the interior of the pan in Figure 1, it is essential that the corners of the area bounded by the side walls of the pan on two sides and the full lines 5 drawn on the opposite two sides be a multiple of the area of the column, so that after one or more pieces of cake have been cut along a pair of the lines 5—6, any of the remaining corners may be cut on either of the dotted lines 7 or 8 and result in pieces of cake exactly the same size as the pieces formed by cutting on any pair of the lines 5 and 6, so that when the cake is ultimately completely cut in accordance with this plan there will result the exact number of pieces for the construction of six sandwiches, or of course any proportional number desired. Obviously if miniature sandwiches may be desired these pieces may be again cut in two, forming twenty-four equally sized pieces.

From the above it is apparent that I have designed a novel proportion of pan and central removable column, possible of accomplishing a novel result in the preparation of desserts and the like, and the opening in the bottom of the pan is large enough to pass the hand therethrough, so that when the cake is cut about the edges of the pan it may be forced therefrom by pushing the column and its attached bottom which covers the opening in the bottom of the pan and thus easily removing the cake from the pan.

Having thus described my invention, what I claim and desire to secure by Letters Patent, is:

1. The method of producing uniform and substantially identically sized service pieces of cake which consists of forming a square cake having vertical sides and a square opening with vertical sides centrally therethrough and of an area equal to one twenty-fifth of the area of said cake, and severing said cake in planes coincident with the planes of the sides of said central opening, and cutting each of the resulting corner pieces centrally in a plane parallel with a side thereof.

2. The method of producing uniform and substantially identically sized service pieces of cake which consists of forming a square cake having vertical sides and a square opening with vertical sides centrally therethrough of a cross sectional area equal at least to one twenty-fifth of the cross sectional area of said cake, then severing said cake in planes coincident with the planes of the sides of said central opening, then cutting each of the resulting corner pieces on planes parallel with a side thereof into pieces equal in size to that of the pieces formed intermediate of said corner pieces.

HELEN D. EKLUND.